United States Patent

[11] 3,622,443

[72] Inventor Sergio F. Galeano
 Toledo, Ohio
[21] Appl. No. 16,294
[22] Filed Mar. 4, 1970
[45] Patented Nov. 23, 1971
[73] Assignee Owens-Illinois, Inc.

[54] CHEMICAL RECOVERY SYSTEM FOR USE IN A PULPING PROCESS
 2 Claims, 4 Drawing Figs.

[52] U.S. Cl. .................................................... 162/36,
 23/48, 23/130, 162/33, 162/35
[51] Int. Cl. ........................................................ D21c 11/02
[50] Field of Search ............................................ 162/30, 33,
 35, 36; 23/48, 49, 129, 130, 131, 132

[56] References Cited
UNITED STATES PATENTS
1,870,944 8/1932 Bradley et al. ................. 162/35
3,003,908 10/1961 Mannbro ....................... 162/33

*Primary Examiner*—S. Leon Bashore
*Assistant Examiner*—Thomas G. Scavone
*Attorneys*—Paul L. Sabatine, R. F. Rywalski and E. J. Holler ABSTRACT: A method for the utilization and recovery of sodium and sulfur values used in pulping processes which method includes contacting a first portion of a bisulfite sulfite solution with the smelt product of the recovery furnace with a resultant solution after clarification that can be employed as a cooking liquor. The bisulfite sulfite solution is produced by scrubbing sulfur dioxide with a sodium carbonate solution having a molar concentration of from 0.1 to 1.0. The second portion of the bisulfite sulfite solution has a molar ratio of 4 to 1 and a pH of about 6.8 to 7.0 and is recycled and combined with the sodium carbonate scrubbing solution.

CHEMICAL RECOVERY SYSTEM FOR USE IN A PULPING PROCESS

BACKGROUND OF THE INVENTION

The present invention pertains to a novel system for the recovery of useable chemicals and the reduction of air pollution in flue gases produced in a neutral sulfite pulping process or in a kraft process. More particularly, the purpose of the invention is to recover objectionable gaseous emissions, specifically sulfur oxides such as sulfur dioxide produced in a pulping mill process and to incorporate the recovered sulfur values into a feasible industrial process for a more practical and economical utilization of the sulfur balance of a pulping manufacturing technique. Specifically, the invention is concerned with a process which will recover sulfur dioxide from flue gases by the utilization of an alkaline solution as the scrubbing agent and in such a manner as to obtain a final liquor consisting of a bisulfite sulfite solution with a molar ratio of 4 to 1 and a pH of about 6.8. This final solution containing the bisulfite sulfite is further utilized for the preparation of a cooking liquor suitable for the pulping of wood.

In the conventional prior art cooking of wood, wood chips are treated in the pulping digestor under predetermined controlled conditions of temperature pressure, time, and liquor chemical composition to give a pulp and liquor for the making of cellulosic products. The composition of the chemical cooking liquor is based, in most cases, on the sulfur content at different stages of the pulping process. The cooking or digesting of the wood takes place either in batch or in a continuous digestor operation and, after the completion of the cook or digestion, the pulp is separated from the liquor, washed and forwarded to different processes of refinement, for paper formation, and the like. The residual liquor, called spent liquor or black liquor, undergoes a series of processes by which it is concentrated to a certain degree by a means of multiple effect evaporators and direct contact evaporators with a subsequent burning of the remaining residue in the recovery process. This burning or combustion of the organic components therein leads to a generation of heat which heat is recovered and used for mill purposes. The generated heat is seldom enough for the needs of the mill. Therefore, it is often necessary and a general practice in the operation of the pulping mills to install power boilers for additional heat generation. These power boilers use conventional or natural occurring fuels such as coal, fuel oil, natural gas and the like. In the case of coal and fuel oil, two fuels that are known to contain sulfur, their combustion produces appreciable amounts of sulfur oxides, mainly sulfur dioxide due to the sulfur content of these natural and primary fuels.

Directing attention again to the spent or black liquor, the inorganic chemical content of the black or spent liquor, which contains valuable sulfur and sodium derivatives, is recovered after combustion as a smelt at the bottom of the recovery furnace. The sulfur compounds present in the smelt are essentially in a reduced form; for example, sodium sulfide. From the recovery furnace, the smelt is conveyed to a smelt dissolving tank where the smelt containing sodium sulfide, sodium carbonate, as a small amount of sodium sulfite and sodium thiosulfate are dissolved in an aqueous media to give the conventional art known product, green liquor. Next, the green liquor is clarified to get rid of dregs or residue from the combustion process which are extraneous to the cooking liquor preparation and the pulping process. The dregs are extraneous because they lack pulping properties and because they are insoluble. In these pulping processes, conventionally employed by the prior art and described immediately above, the green liquor is frequently treated to a causticizing process in which lime is added to precipitate the carbonate ion ($CO_3^{-2}$) and to form a final liquor of sodium sulfide ($Na_2S$) and sodium hydroxide ($NaOH$) composition, which may be used in conventional kraft sulfate pulping process. If the pulping process in use is the neutral sulfite semichemical process, the green liquor is contacted in a conversion tower with sulfur dioxide gases to produce a sulfite solution with an inherent loss of hydrogen sulfide ($H_2S$), which is released into the atmosphere at the conversion tower. Also, in the heretobefore used prior art processes, when there was a generation of heat and a recovery of sulfur values by these processes, little attention was paid to the recovery of the sulfur dioxide from power boilers and recovery boilers and the sulfur dioxide was used as part of the chemical pulping process. With the well known neutral sulfite semichemical process, little or no attention was paid to the recovery of or elimination of objectionable emissions of undesirable gases such as $H_2S$ and $SO_2$.

Accordingly, in view of the above presentation, it is an immediate object of the subject invention to provide a novel and integrated process for the recovery of sulfur oxides, mainly sulfur dioxide, from the flue gases emitted in the combustion processes, generally the generation of heat and in the combustion of prior art pulp liquor.

Still yet another important object of the subject invention is to provide a novel and integrated process for the recovery of sodium and sulfur values for the production of a novel cooking liquor.

Yet another object of the present invention is to provide a process for the contacting of sulfur dioxide with sodium carbonate or sodium hydroxide solution to produce a bisulfite sulfite solution with a molar ratio of 4 to 1 and a pH of about 6.8 to 7. The bisulfite sulfite solution can be contacted with the smelt product of the recovery furnace to produce an unclarified cooking liquor.

Another object of the present invention is to recover the sulfur dioxide in a suitable form to be of immediate use in a pulping mill process.

Yet still a further object of the invention is to modify or essentially eliminate objectionable gaseous emission from the combustion of black liquor, from flue gases resulting in the generation of heat, and from the processing of the green liquor.

These and other objects as well as features and advantages of the present invention will become more fully evident from the accompanying drawings and specification and claims.

SUMMARY OF THE INVENTION

This invention concerns a process for the recovery of sulfur values, mainly sulfur dioxide, from flue gases by the utilization of an alkaline solution as a scrubbing agent with the production of a liquor consisting of bisulfite sulfite solution wherein the molar ratio of the bisulfite to sulfite is 4 to 1 and which solution has a pH of about 6.8. The solution produced by recovery of the sulfur dioxide from the flue gas emission of recovery and heat producing process with the alkaline solution can be employed as a cooking liquor suitable for the pulping of wood. The recovery of the sulfur dioxide values from flue gases and the production of the cooking liquor suitable for pulping of wood described by this invention can be used in a neutral semichemical sulfite pulping method, although other embodiments of the invention are applicable to krafting or sulfite pulping processes and the like.

DETAILED DESCRIPTION OF THE INVENTION

Figure 1:
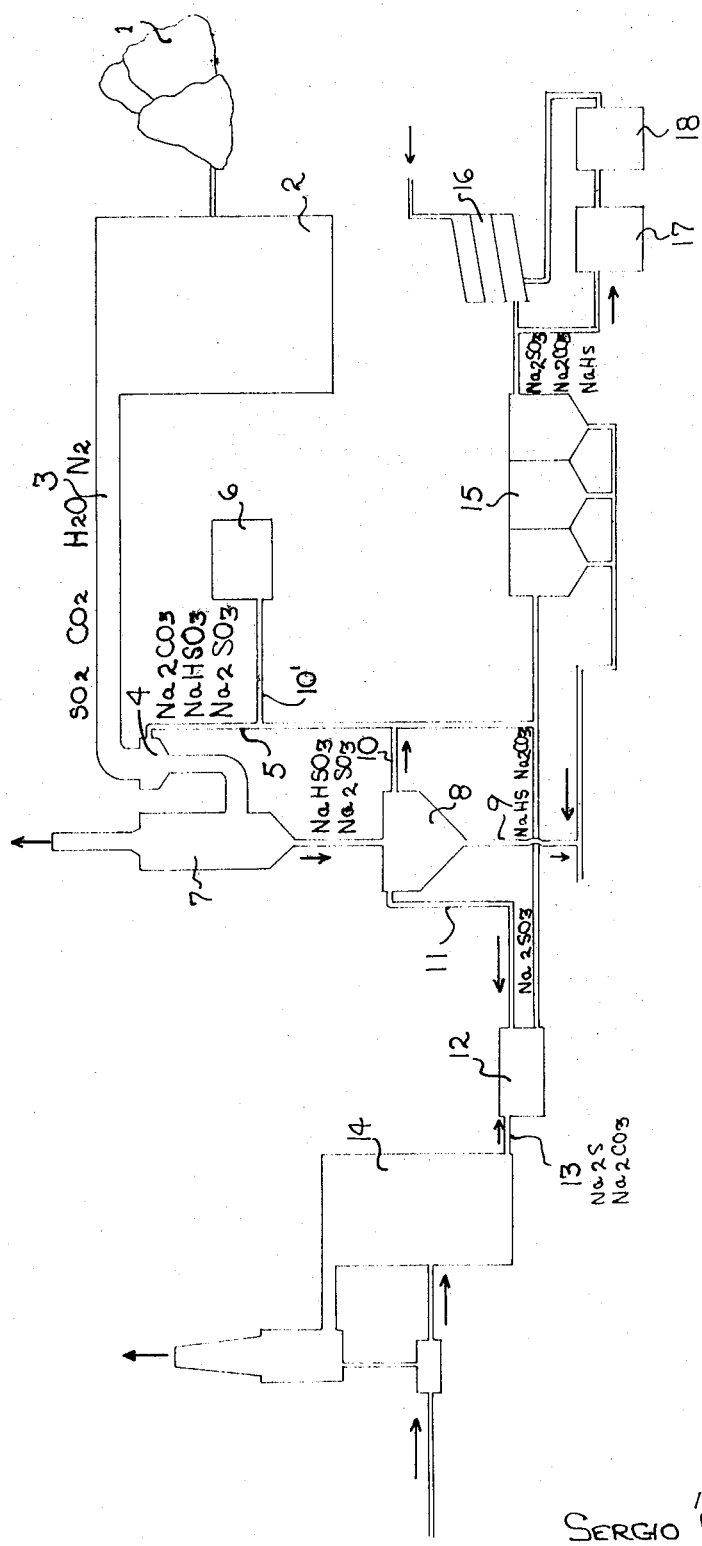
FIG. 1 is a diagrammatic sheet, illustrating a semichemical sulfite pulping process with a recovery system for gaseous sulfur dioxide as produced in the power boiler and from a recovery furnace.

Referring now more specifically to the drawings and by way of introduction, there is shown in FIG. 1 a block outline flow diagram, generally illustrating the embodiment of the invention. Coal or a combustionable fuel oil, generally coal containing about three percent sulfur, indicated in the drawing as 1, is fed into a power boiler 2 and burned for the production of heat. The flue gases from the combustion process of furnace 2 are released through a flue 3 and the flue gases consist mainly of sulfur dioxide, carbon dioxide, nitrogen, nitrogen oxides, water and other unidentified gaseous products. These flue gases are conveyed from the combustion process into an absorption device of the Venturi scrubber type 4 for contacting and absorbing the $SO_2$ of the flue gas into a scrubbing solution which is injected into the Venturi scrubber 4. The solution used for absorbing the $SO_2$ emitted through flue 3 is prepared in a tank identified as 6. The solution in the tank 6 is prepared either from soda ash or caustic or mixtures thereof, and the molarity of the $Na_2CO_3$ produced therein is about 0.2 to 0.8 molar.

The solution from tank 6 is fed directly to the Venturi or mixed with the recirculated flow from tank 8 by means of conduit 10', and this solution containing $Na_2CO_3$, $Na_2SO_3$ and $NaHSO_3$, is fed into the Venturi scrubber 4. The incoming flue gas containing the $SO_2$ comes into contact with the solution in the scrubber and, in the scrubber, the $SO_2$ content is reduced to about 95 percent of its original $SO_2$ prescrubbed content. From the venturi scrubber, the solution passes into a cyclone separator 7 which cyclone separates the aqueous components containing $SO_2$ in solution, that is, $NaHSO_3$ and $Na_2SO_3$ into sedimentation tank 8. Clean air is emitted at the top of cyclone 7 and from sedimentation tank 8 soot and flyash are removed through 9 to a waste disposal area (not shown). Also, some of the $NaHSO_3$ and $Na_2SO_3$ present in sedimentation tank 8 are conveyed via conduit 10 into line 5 for re-entry into the Venturi scrubber for further absorption of $SO_2$. Some of the solution in sedimentation tank 8 is conveyed through conduit 11 to smelt dissolving tank 12, where the solution comes into contact with a smelt containing $Na_2S$ and $Na_2CO_3$, which enters the dissolving tank 12 by conduit 11. The smelt is produced from black liquor burned in recovery furnace 14 to give the smelt which is dissolved in an aqueous media in tank 12. The portion of the liquor from tank 8 conveyed through conduit 10 into scrubbing unit 4, is converted from sulfite to bisulfite upon absorption of $SO_2$. In this fashion, a more economical way of scrubbing is attained since less chemical reactants are required. Heretobefore in the prior art, either the use of soda ash or caustic or both achieved the absorption of 1 mole of sulfur $SO_2$ with 1 mole of $Na_2CO_3$ or 2 moles of NaOh according to the following equations: $Na_2CO_3 + SO_2 \rightleftharpoons Na_2SO_3 + CO_2$ and $2NaOH + SO_2 \rightleftharpoons Na_2SO_3 + H_2O$. The present process required a 4 to 1 molar ratio of bisulfite to sulfite in the recirculation of the original sulfite solution which will absorb $SO_2$ according to the following equation: $Na_2SO_3 + SO_2 + H_4{}^{\upsilon} \rightarrow 2NaHSO_3$.

In the dissolving tank 12, the smelt 13, coming from the combustion under reduced conditions of furnace 14 is contacted with the bisulfite sulfite solution to produce a solution with NaHS, $Na_2SO_3$, and $Na_2CO_3$ as the main components. The product is not, therefore, a conventional green liquor which consists essentially of $Na_2S$ and $Na_2CO_3$. The liquor in dissolving tank 12 is next transferred to the clarifiers in tank 15 to separate impurities and from there it can be sent to digester 16, where it is suitable for the digestion of or pulping of wood chips in the digester. Also, some of this solution from clarifier tanks 15, which contain $Na_2SO_3$, $Na_2CO_3$ and NaHS can be conveyed to enrichment tanks 17 for evaporation of any excess liquor that may be present and then further to the storage tank 18 for storage prior to use before it passes into digester 16. As can be seen, the present invention, as set forth in the process depicted in FIG. 1, produces a new cooking liquor which can be used for the purposes of digesting wood chips and, in addition, the process of the invention sets forth recovery steps which eliminate the needs for purchasing sulfur for $SO_2$ generation of a spent pulping liquor into an acceptable pulping liquor. Also, the process substantially eliminates air pollution by the discharge of sulfur dioxide from the recovery boiler and heat boiler into the atmosphere. The process further inherently eliminates the discharge or loss of $H_2S$ in the sulfitation step of the recovery process.

Figure 2:
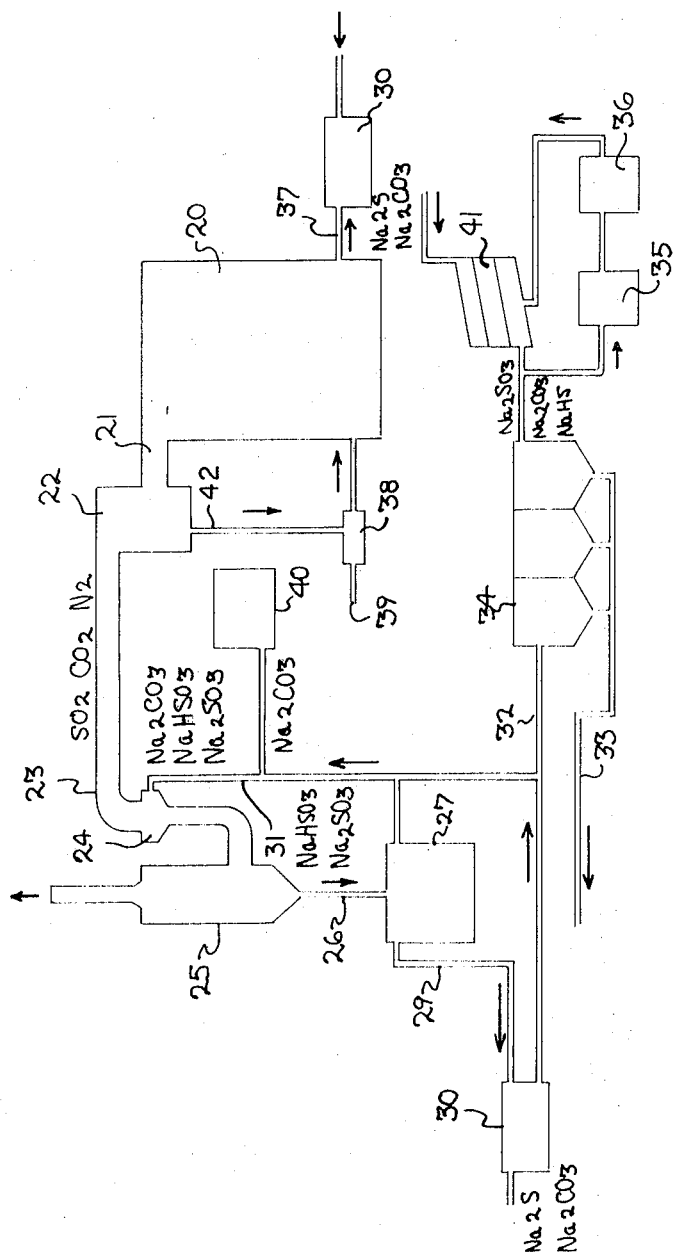
FIG. 2 is a diagram representing another embodiment of the invention for the recovery of $SO_2$ gases from the furnaces which are used for producing heat and the combustion of black liquor.

FIG. 2 illustrates another embodiment of the invention that can be used in a pulping mill. In FIG. 2, the compositions of the flue gas from the recovery furnace containing sulfur dioxide are reclaimed for use in a pulping broth in a digester. In FIG. 2, black liquor is fed into recovery boiler 20 where it is burned with the production of heat and gaseous products. The gaseous products pass through flue 21 into the electrostatic precipitator 22. In the electrostatic precipitator 22, particles, such as $Na_2SO_4$, $Na_2CO_3$ and $Na_2O$ are removed from the flue gas. The removed chemical particles from the precipitator are conveyed by conduit 42 into tank 38 where they are mixed with black liquor 39 for recirculation into recovery boiler 20 for increase recoverage of sulfur values. The flue gas leaving electrostatic precipitator 22 is conveyed through flue 23 and into Venturi scrubber 24. The flue gas of a properly operated furnace could contain $SO_2$, $CO_2$ and $N_2$ and other unidentified gaseous products. These flue gases, as they enter the Venturi scrubber, are scrubbed for contacting and absorbing the $SO_2$ of the flue gas into a scrubbing solution which is injected into the Venturi scrubber, by feed line 31, and the injected solution contains $Na_2CO_3$, $NaHSO_3$ and $Na_2SO_3$ according to the recirculation. The solution injected from 31 is prepared in tank 40 from caustic or soda ash. After leaving the Venturi scrubber, the scrubbed flue gas containing various particles pass into cyclone separator 25 which separates the aqueous components containing $SO_2$ in the solution; that is, $NaHSO_3$ and $Na_2SO_3$ from the gaseous emission products which passes out of the top of the separator into the air and in essentially clean form while the heavier particles pass into sedimentation tank 27. From sedimentation tank 27, the dissolved chemical reagents are passed into dissolving tank 30 through pipe 29 where they are met by incoming smelt containing $Na_2S$ and $Na_2CO_3$. Next, the smelt particle enriched solution is passed from the dissolving tank 30, to the clarifiers 34, through conduit 32 where in the clarifier, dregs are removed from the bottom of the clarifiers and passed to waste disposal through conduit 33. The solution leaving the clarifier containing $Na_2SO_3$, $Na_2CO_3$ and NaHS is passed into enrichment tank 35 for adequate control of final concentration of the solution and then to storage tank 36 where it is kept until it is used in digester 41 for digesting wood chips entering digester 41. Thus, the common operation of the recovery furnace finally results in emission of sulfur gases containing either $SO_2$ or $H_2S$ and organic sulfides which are recovered for use in the pulping process. The particles $Na_2SO_4$, $Na_2CO_3$ and $Na_2O$, which are collected, are introduced or mixed with black liquor and passed back into the furnace for further reclaimation of the particles as sulfur values. The scrubbing and separation takes place in a similar way to that described in FIG. 1. Since these particles have been removed by the precipitator, there is in the present example, as set forth in FIG. 2, no need for a sedimentation tank to collect them from the resulting scrubbing liquor. The storage tank 36 serves the purpose of collection of the sulfur values and equalizing the final concentration of the cooking liquor. This embodiment of the invention clearly illustrates the combined advantages for recovery of sulfur values and elimination of gaseous $SO_2$ and other undesirable gases from the atmosphere.

Figure 3:
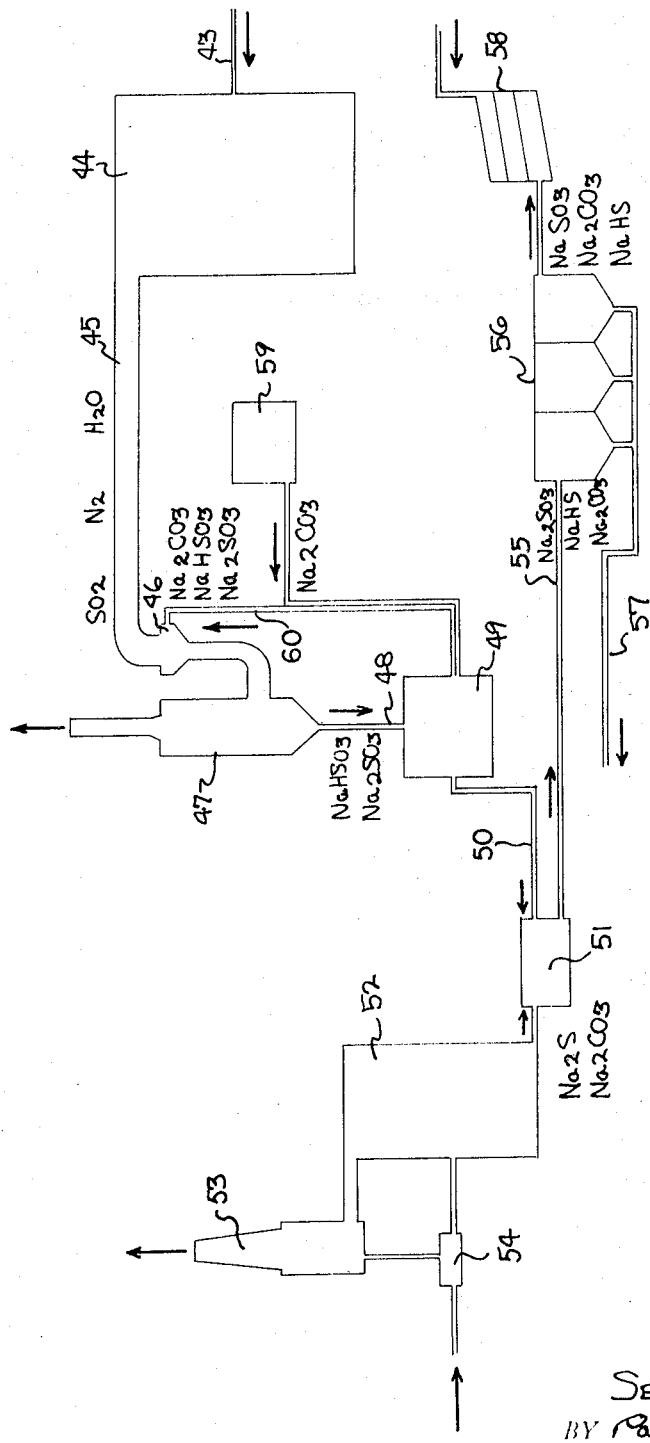
FIG. 3 illustrates an embodiment of the invention which no $SO_2$ has been emitted in a power boiler because of the employment of a natural gas.

In FIG. 3, there is illustrated a further application of the principles of the invention involving a neutral sulfite semichemical process. In this embodiment, no sulfur dioxide is being emitted in the power boiler because of the use of natural gas which is essentially free of sulfur and accordingly does not produce $SO_2$. Secondly, no sulfur dioxide is recoverable from the recovery furnace because of its insignificant amount and/or the predominance of other gaseous sulfide present in the flue gases. The application of the invention would consist in using a conventional sulfur burner with incoming sulfur entering the burner through 43 being combusted in sulfur burner 44 with its gaseous products transmitted through flue 45 to Venturi scrubber 46. In Venturi scrubber 46, the gaseous products are scrubbed with a solution prepared in tank 59 formed from caustic or elimination ash, which solution is then transferred into Venturi scrubber 46. The solution next passes from Venturi scrubber 46 into cyclone 47 where the aqueous phase is separated out and passes into tank 49. The solution contains sodium carbonate, sodium bisulfite and sodium sulfite with a controlling pH of 6.8 to 7 and a molar ratio of bisulfite to sulfite of 4 to 1. Cleaned air passes out through the top of cyclone 47. In tank 49, the solution is conveyed by conduit 50 to dissolving tank 51 where it is met by incoming smelt leaving recovery furnace 52. The smelt is prepared from black liquor 54 entering the recovery furnace 52 for combustion of the spent pulp with a cyclone separator 53, removing heavier products before any gas is discharged into the atmosphere. The removed particles are combined with black liquor 54 for entering into recovery furnace 52. The smelt leaving dissolving tank 51 is conveyed by pipe 55 into clarifier 56. In the clarifier, which is separator 56, separation occurs and the separated unwanted dregs leave through pipe 57 to waste disposal, not shown. The clarifier solution containing the chemicals $Na_2SO_3$ and $Na_2CO_3$ and NaHS passes through 59 into pulp digester 58, where incoming wood chips are digested by the pulping solution. The scrubbing procedure, as mentioned before, produces a bisulfite to sulfite solution with a molar ratio of 4 to 1. The resulting scrubbing solution is collected in tank 49 from which it is recirculated back to the scrubbing unit through conveying means 60 and then to smelt dissolving tank 51, where a new pulping liquor is formed, This novel, and unobvious direct sulfitation process, does not emit any $H_2S$ and the sulfur level is reduced by 25 percent to 30 percent with the concurrent elimination of objectionable gaseous pollutants. In the prior art direct sulfitation process, upon contact of the green liquor with sulfur dioxide in a conversion tower, to produce a liquor rich in sulfite, the hydrogen sulfite will escape out of the conversion tower into the atmosphere, in order to satisfy stoichiometric conditions. This invention eliminates the prior art sulfitating as source of pollution, with an accompanying reduction of sulfur costs of about 25 to 35 percent. With this invention the prior art green liquor will not be processed in the neutral sulfite semichemical process by direct sulfitation in a conversion tower; and, for the kraft process the green liquor will not be processed by the causticizing process. The cooking liquor of this invention can be used for the production of a pulping liquor suitable for the manufacture of either linerboard or corrugated media.

The above description and the following disclosure are examples that are representative of the spirit of the invention, and are not to be construed as limiting the invention, as these and other methods will be obvious to those versed in the art from the accompanying tables and explanations set forth immediately below.

TABLE I

Table I shows the experimental condition and results therefrom during which the flue gases containing $SO_2$ were scrubbed with a carbonate solution to form a bisulfite sulfite solution at different liquid-gas ratio and different concentration of the scrubbing solution. In the Table, the temperature inlet records the temperature of the flue gas entering the Venturi scrubber and the outlet temperature is the temperature of the gas leaving the cyclone. The "Flow" is the flow of flue gas and scrubbing liquor. The "Molarity" is the concentration of the scrubbing liquor, "g.p.m." means gallons per minute and "c.f.m." means cubic feet per minute. The "$SO_2$" concentration is at the inlet of the Venturi scrubber, the outlet of the cyclone, and "p.p.m." means parts per million. In table I, the flow of the flue gas was from about 2900 cubic feet a minute to about 3300 cubic feet a minute and amount of scrubbing liquor entering the Venturi was about 3 gallons per minute to about 10 gallons per minute. The scrubbing liquor was $Na_2CO_3$ and it had a molarity of from about 0.05 to 0.35.

TABLE 2

Table 2 is similar to table 1 except that the velocity of the flue gas and the scrubbing liquid through the throat section of the Venturi scrubber is 250 feet per second instead of 350 feet per second as in table 1. In table 2, the amount of scrubbing liquor, $Na_2CO_3$, used was from about 2 gallons per minute to about 8 gallons per minute and it had a molarity of about 0.05 to 0.40. The flow of the flue gas was from about 2100 cubic feet a minute to about 2600 cubic feet a minute.

TABLE 3

Table 3 indicates the chemical composition of the cooking liquor for a neutral sulfite semichemical process (NSSC) that was prepared by the invention. Other cooking concentration can be produced by using the bisulfite sulfite molar ratio of 4 to 1 and a pH of 6.8 to 7.0, by changing the concentration of the scrubbing solution at the stated molar ratio. Another way would be by adding aqueous media to the smelt to obtain the predetermined concentrate upon reactions with the bisulfite sulfite solution. In the Table, NSSC, is a prior art neutral sulfate semichemical process and "Invention" is the composition of a cooking liquor of the subject disclosure. The expression bisulfite sulfite as used throughout the disclosure is to be understood to be the sodium forms, that is, sodium bisulfite $NaHSO_3$, and sodium sulfite $Na_2SO_3$.

TABLE I

| Temperature, °F. | | Flow | | | $SO_2$ concentration, p.p.m. | | | Percent removed |
| --- | --- | --- | --- | --- | --- | --- | --- | --- |
| | | Liquid | | Gas, | | | | |
| Inlet | Outlet | Molarity | G.p.m. | c.f.m. | Inlet | Outlet | Diff. | |
| 366 | 174 | 0.05 | 3.15 | 3,225 | 919.5 | 496.0 | 423.5 | 45.98 |
| 366 | ---------- | 0.05 | 3.20 | 3,225 | 930.4 | 501.7 | 428.7 | 46.08 |
| 365 | 172 | 0.05 | 6.6 | 3,030 | 905.2 | 360.8 | 544.4 | 60.14 |
| 365 | ---------- | 0.05 | 6.6 | 3,030 | 956.1 | 361.4 | 594.7 | 62.20 |
| 366 | 170 | 0.05 | 9.55 | 2,900 | 1,015.5 | 286.6 | 728.9 | 71.78 |
| 366 | ---------- | 0.05 | 9.55 | 2,950 | 867.8 | 52.0 | 615.8 | 69.85 |
| 377 | 174 | 0.20 | 3.10 | 3,200 | 1,082.0 | 398.1 | 683.9 | 63.22 |
| 390 | 176 | 0.20 | 3.10 | 3,250 | 1,251.4 | 476.3 | 775.1 | 61.95 |
| 353 | 171 | 0.20 | 6.70 | 3,000 | 893.1 | 156.4 | 736.7 | 82.49 |
| 360 | 172 | 0.20 | 6.70 | 3,010 | 873.6 | 140.4 | 733.2 | 82.93 |
| 360 | 171 | 0.20 | 9.30 | 2,900 | 796.6 | 92.9 | 676.7 | 87.93 |
| 342 | 168 | 0.20 | 9.30 | 2,800 | 650.0 | 90.0 | 560.0 | 86.16 |
| 358 | 172 | 0.35 | 3.10 | 3,200 | 178.8 | 319.0 | 399.8 | 55.62 |
| | | | 3.10 | 3,200 | 695.5 | 251.5 | 445.0 | 63.89 |
| 355 | 170 | 0.35 | 6.5 | 3,025 | 763.2 | 130.2 | 633.0 | 82.94 |
| 355 | ---------- | 0.35 | 6.5 | 3,025 | 774.7 | 126.4 | 648.3 | 83.68 |
| 355 | 160 | 0.35 | 9.5 | 2,925 | 817.2 | 78.6 | 738.6 | 90.38 |
| 357 | ---------- | 0.35 | 9.5 | 2,925 | 805.5 | 77.9 | 727.6 | 90.32 |

TABLE 2

| Temperature, inlet, °F. | Flow | | | SO2 concentration, p.p.m. | | | Percent removed |
|---|---|---|---|---|---|---|---|
| | Liquid | | Gas, c.f.m. | Inlet | Outlet | Diff. | |
| | Molarity | G.p.m. | | | | | |
| 326 | 0.05 | 2.8 | 2,550 | 819.5 | 501.8 | 317.7 | 38.76 |
| 326 | 0.05 | 2.8 | 2,550 | 866.4 | 556.6 | 309.8 | 35.75 |
| 325 | 0.05 | 5.2 | 2,250 | 851.5 | 368.8 | 482.7 | 56.68 |
| 328 | 0.05 | 5.2 | 2,250 | 930.0 | 378.9 | 551.1 | 59.26 |
| 325 | 0.05 | 7.4 | 2,150 | 950.3 | 315.0 | 635.3 | 66.85 |
| 324 | 0.05 | 7.4 | 2,150 | 942.0 | 402.0 | 540.0 | 57.30 |
| 340 | 0.20 | 2.70 | 2,450 | 852.4 | 428.8 | 423.6 | 49.70 |
| 340 | 0.20 | 2.65 | 2,450 | 895.8 | 456.3 | 439.5 | 49.06 |
| 342 | 0.20 | 5.0 | 2,300 | 915.2 | 313.6 | 601.6 | 65.73 |
| 342 | 0.20 | 5.0 | 2,300 | 962.5 | 340.0 | 622.5 | 64.67 |
| 340 | 0.20 | 7.1 | 2,250 | 996.7 | 245.7 | 751.0 | 75.35 |
| 340 | 0.20 | 7.1 | 2,250 | 965.3 | 340.0 | 622.5 | 76.93 |
| 331 | 0.35 | 2.7 | 2,450 | 873.2 | 418.0 | 455.0 | 52.12 |
| 335 | 0.35 | 2.7 | 2,450 | 1,000.0 | 441.0 | 559.0 | 55.90 |
| 341 | 0.35 | 5.1 | 2,250 | 958.2 | 312.7 | 645.5 | 67.37 |
| 356 | 0.35 | 5.1 | 2,300 | 902.6 | 338.2 | 564.4 | 62.53 |
| 351 | 0.35 | 7.2 | 2,190 | 1,043.1 | 250.7 | 792.4 | 75.96 |
| 331 | 0.35 | 7.2 | 2,190 | 920.1 | 207.2 | 712.9 | 77.48 |

TABLE 3

| Components | NSSC | Invention |
|---|---|---|
| Na2CO3 | 0.5M | 0.4M |
| NaHS | 0.1-0.2M | 0.6-0.8M |
| Na2SO3 | 0.7-1.0M | 0.7-1.0M |

TABLE 4

Table 4 sets forth the results of an analysis of a pulp prepared by using the cooking liquor of table 3 indentified as "Invention." The cooking conditions were performed under identical conditions of temperature, pressure, time and kind of wood. Only the cooking liquor was changed in the digester. In table 4, cooks identified as "A" and "B" are cooking liquors produced by this invention. The standard is the neutral sulfide semichemical process. All the tests such as ring crush, tear etc. are art standard test.

TABLE 4

| | A | B | Standard |
|---|---|---|---|
| Ring crush | 47.8 | 53.4 | 53.0 |
| Tear | 89.0 | 81.0 | 82.0 |
| Tensile | 29.9 | 28.3 | 30.3 |
| Canada Concora Crush | 26.3 | 26.4 | 26.8 |
| Mullen | 54.4 | 52.4 | 56.0 |
| Refining time (min.) | 49 | 47 | 23 |
| Brightness | 12.0 | 11.0 | 14.2 |
| Yield | 69.0 | 69.3 | 69.8 |
| Caliper | 12.7 | 11.7 | 12.3 |

FIGURE 4

Figure 4:
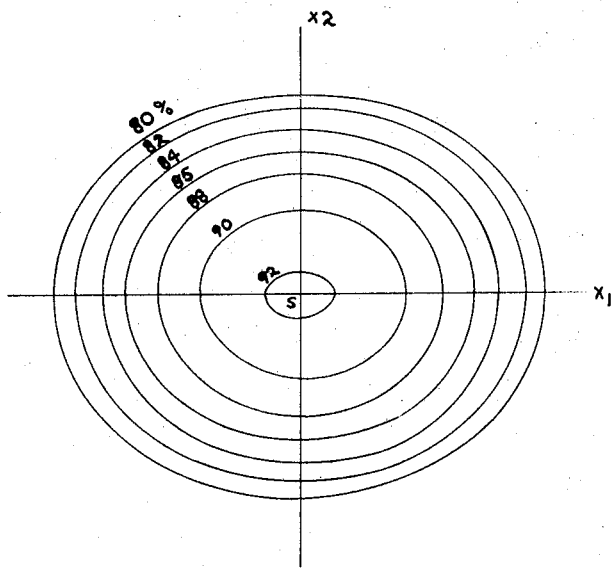
FIG. 4 illustrates a response curve for optimizing the performance of the invention.

FIG. 4 indicates a surface response curve used to optimize the removal of sulfur dioxide from the flue gas according to the most important variables, that is, molarity of the scrubbing solution, and the scrubbing liquid flue gas ratio. The equation for response curve is:

$$Y = 81.89 + 13.36X_1 + 9.26X_2 - 6.43X_1^2 - 9.0X_2^2 + 1.51X_1X_2$$

at 350 feet per second of velocity through the Venturi throat. The equation for 250 feet per second of solution gas velocity through the throat is:

$$Y = 65.90 + 12.38X_1 - 3.44x_1^2 - 4.74X_2^2 - 0.53X_1X_2$$

where in both equations $X_1$ is the ratio of scrubbing liquor to flue gas flow expressed as gallons per minute cubic feet per minute and $X_2$ is the molarity of the scrubbing solution. The values 81.89 and 65.90 are constants and the optimum condition for 350 feet per second is when $X_1 = 1.14$ and $X_2 = 0.61$. The optimum condition at 250 feet per second is when $X_1 = 1.76$ and $X_2$ is 0.58. The optimum conditions can also be ascertained from FIG. 4.

I claim:

1. A process for recovery of sodium and sulfur base cellulosic pulping chemicals in a spent pulping liquor wherein the process consists essentially of intimately contacting and simultaneously scrubbing gaseous sulfur dioxide with a sodium carbonate solution having a molar concentration of 0.1 to 1 to produce a sodium bisulfite sodium sulfite solution with a molar ratio of 4 to 1 and a pH of 6.8 to 7.0 recycling a portion of said sodium bisulfite sodium sulfite solution to said contacting step, and then contacting spent pulping liquor smelt with the other portion of said sodium bisulfite sodium sulfite solution to produce a pulping liquor suitable for pulping cellulosic materials.

2. A process for recovery of sodium and sulfur base cellulosic pulping chemicals in a spent pulping liquor wherein the process consists essentially of intimately contacting and simultaneously scrubbing a gas containing sulfur dioxide flowing at the rate of 2100 cubic feet a minute to 3300 cubic feet a minute with a 0.1 to 1 molar solution of sodium carbonate at a rate of 2 gallons per minute to 10 gallons per minute to produce a sodium bisulfite sodium sulfite solution with a molar ratio of 4 to 1 and a pH of 6.8 to 7.0 recycling a portion of said sodium bisulfite sodium sulfite solution to said contacting step and then contacting the other portion of said sodium bisulfite sodium sulfite solution with spent pulping liquor smelt to produce a pulping liquor suitable for pulping cellulosic materials.

* * * * *